July 23, 1929.  J. E. BATIE  1,721,895
APPARATUS FOR ASSEMBLING VEHICLE SPOKED WHEELS
Filed Dec. 22, 1926  5 Sheets-Sheet 1

INVENTOR
JOSEPH E. BATIE
BY
ATTORNEYS

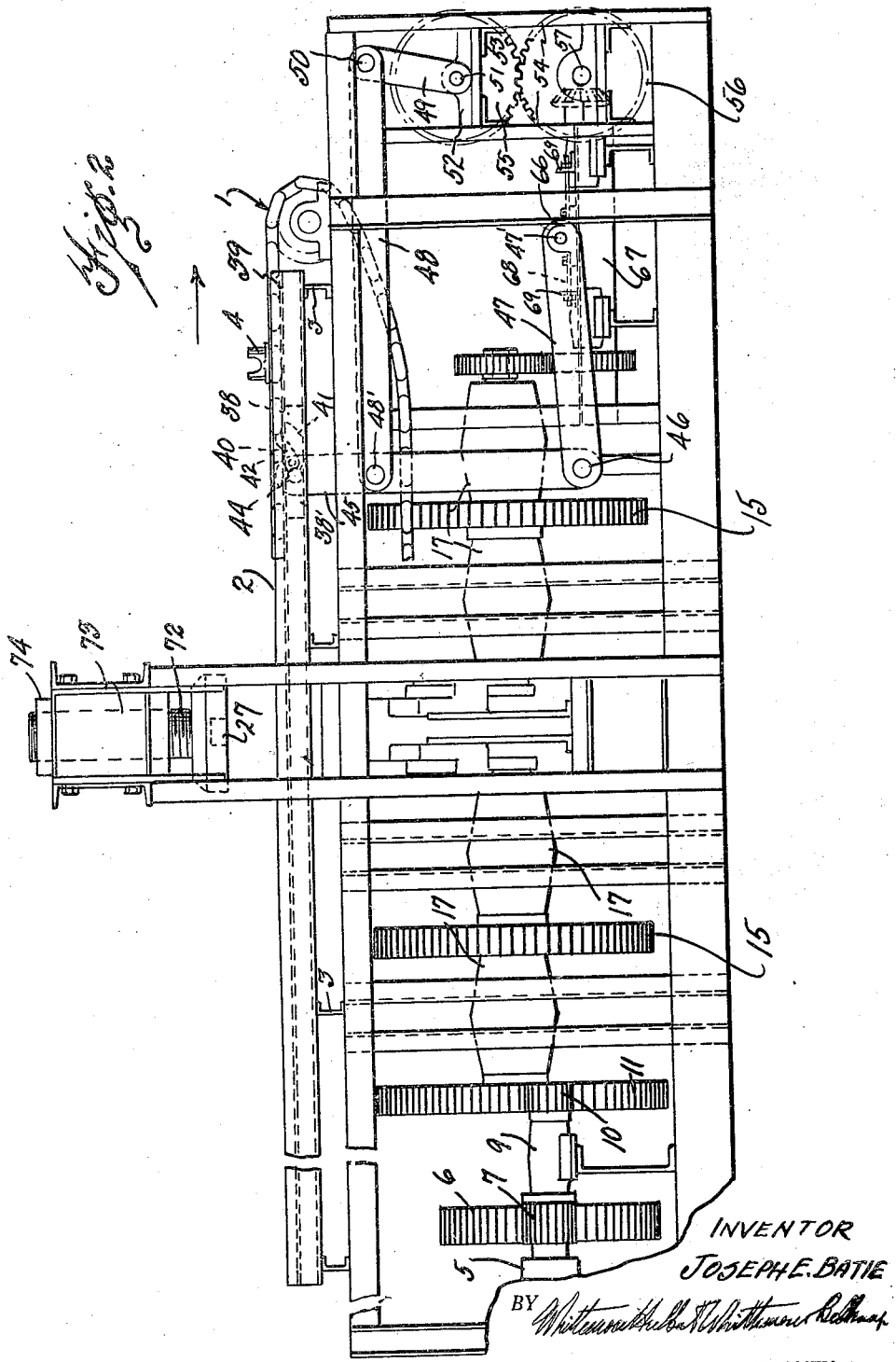

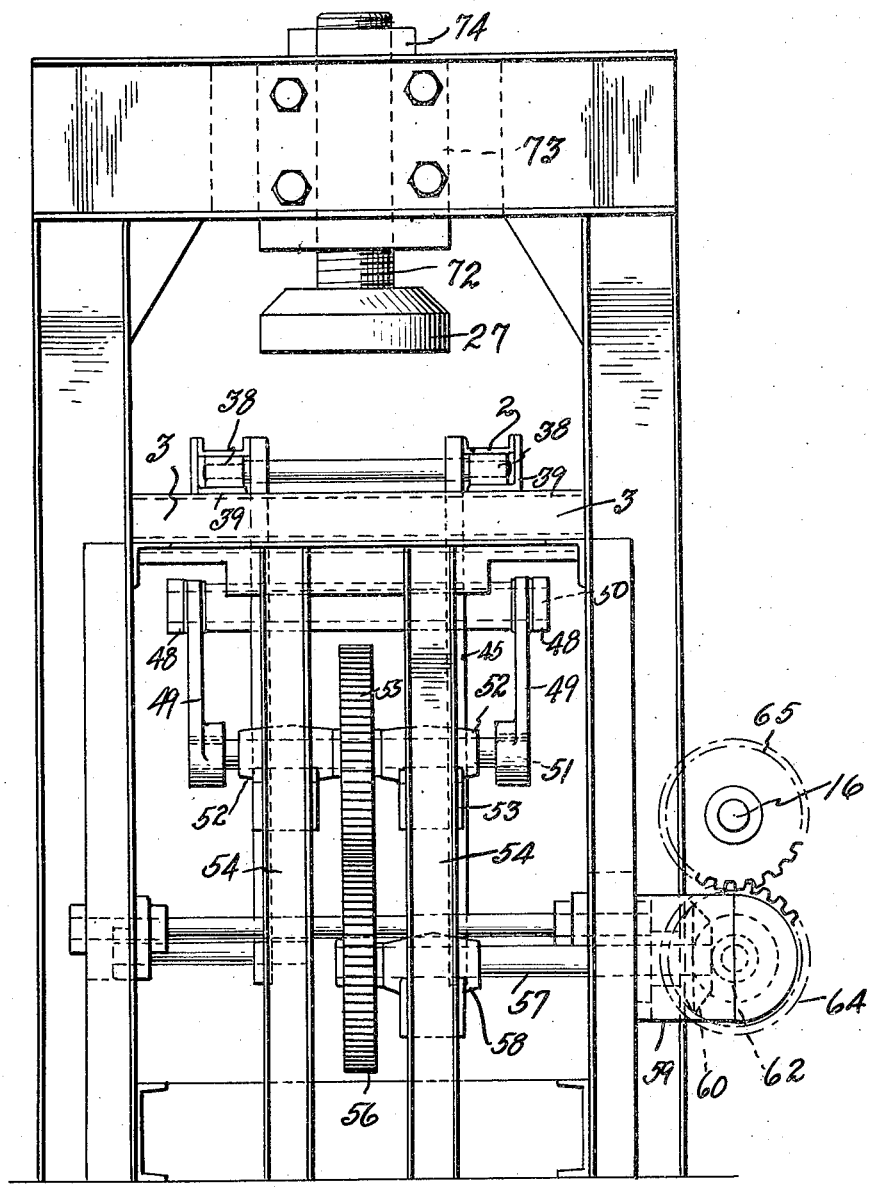

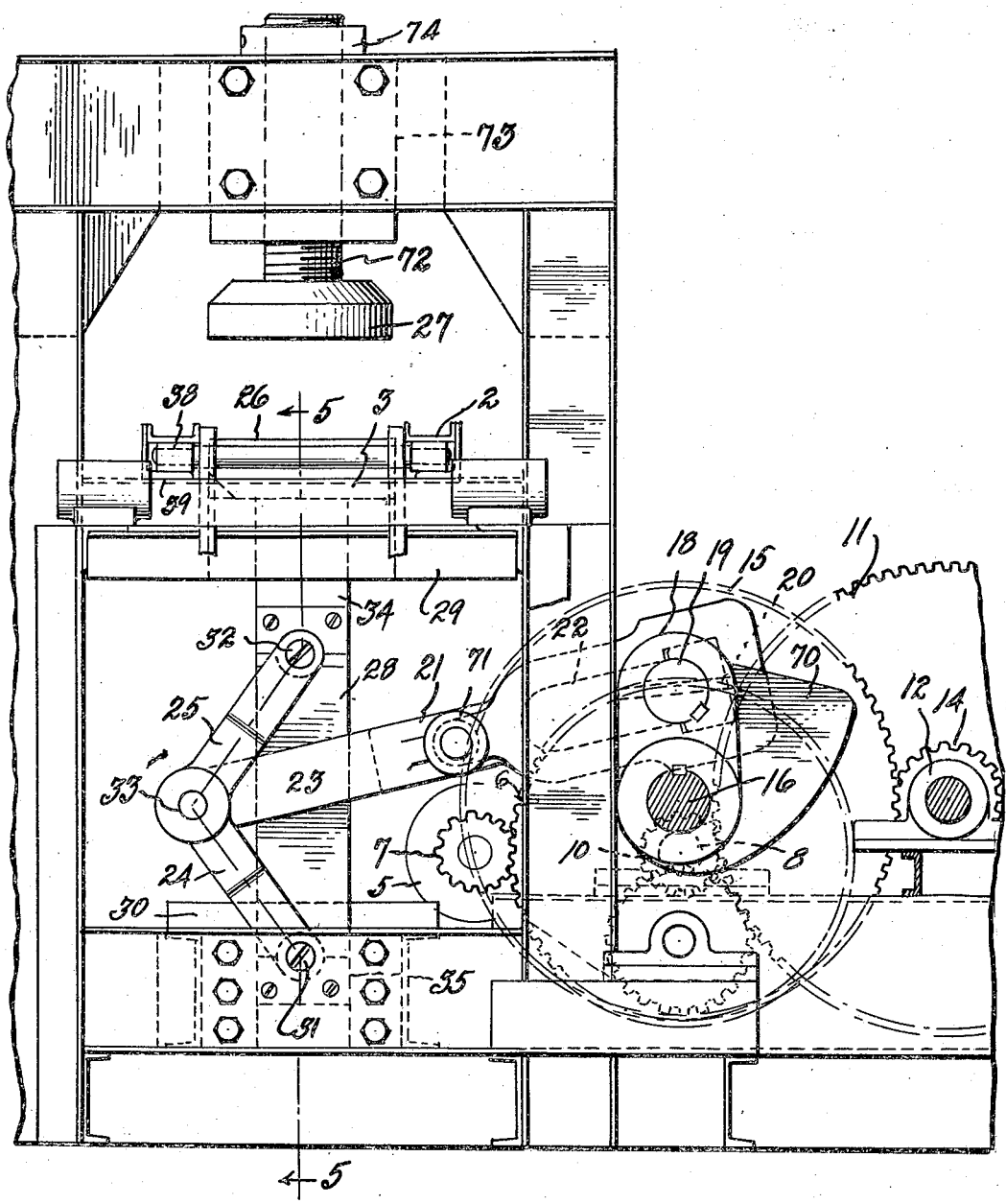

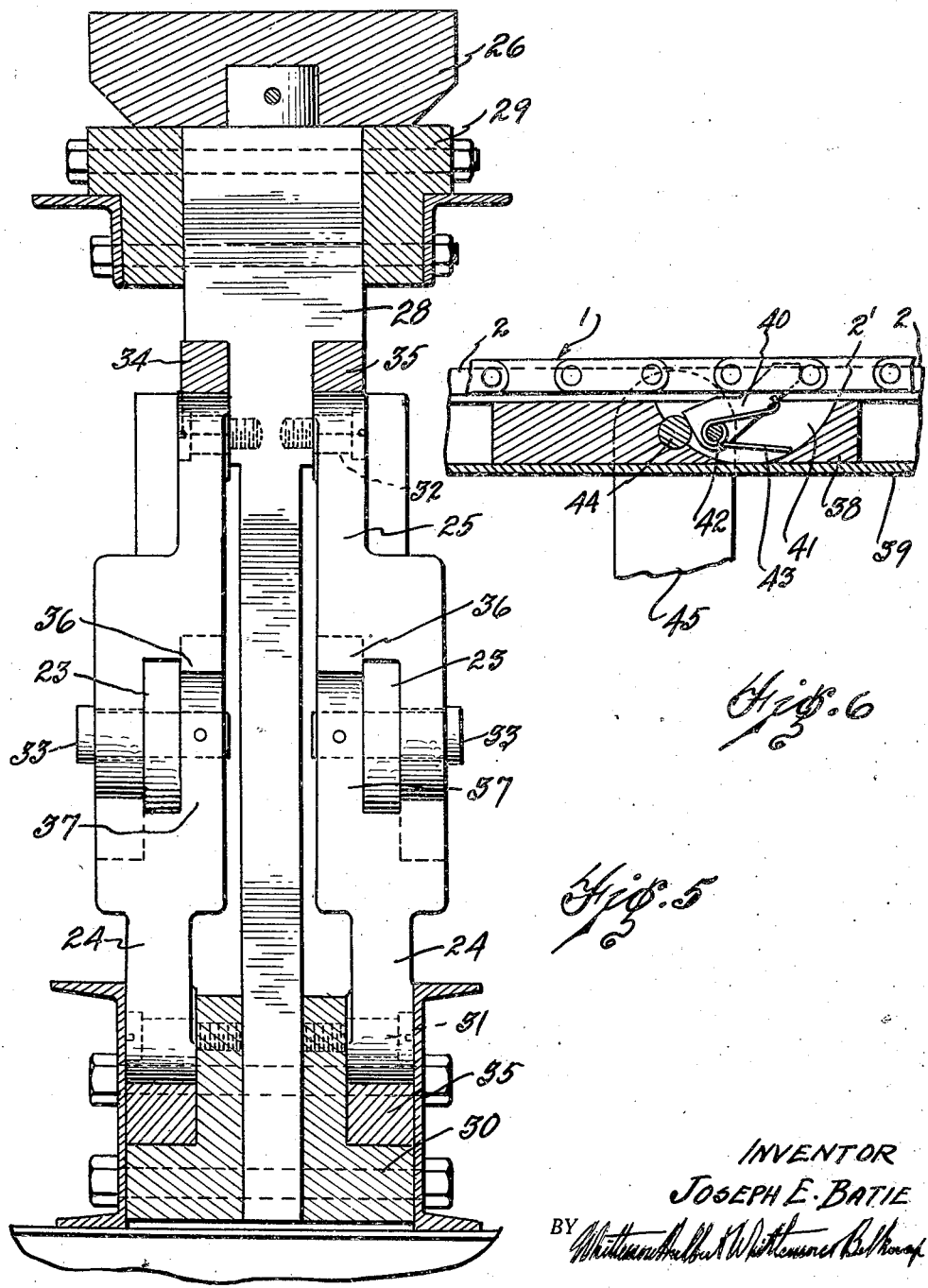

Patented July 23, 1929.

1,721,895

UNITED STATES PATENT OFFICE.

JOSEPH E. BATIE, OF DETROIT, MICHIGAN, ASSIGNOR TO KELSEY WHEEL COMPANY, INC., OF DETROIT, MICHIGAN, A CORPORATION OF NEW YORK.

APPARATUS FOR ASSEMBLING VEHICLE SPOKED WHEELS.

Application filed December 22, 1926. Serial No. 156,461.

The invention relates to apparatus for assembling vehicle spoked wheels and has for one of its objects the provision of an improved apparatus for advancing partially assembled wheels and completing their assembly during the advancement. Other objects are to provide a mechanical operating means for forcing the spokes of the wheel as initially assembled into their final operative positions; to provide a mechanical operating means so arranged that the pins connecting the parts forming the mechanical operating means are relieved from excessive load; and to provide an adjustable operating means for advancing the wheels.

With these and further objects in view, the invention resides in the novel features of construction and combinations and arragements of parts as more fully hereinafter set forth.

In the drawings:—

Figure 2 is a rear side elevation thereof;

Figure 3 is an end view thereof;

Figure 4 is a cross section on the line 4—4 of Figure 1;

Figure 5 is a cross section on the line 5—5 of Figure 4;

Figure 6 is an enlarged cross section on the line 6—6 of Figure 1.

Figure 1:
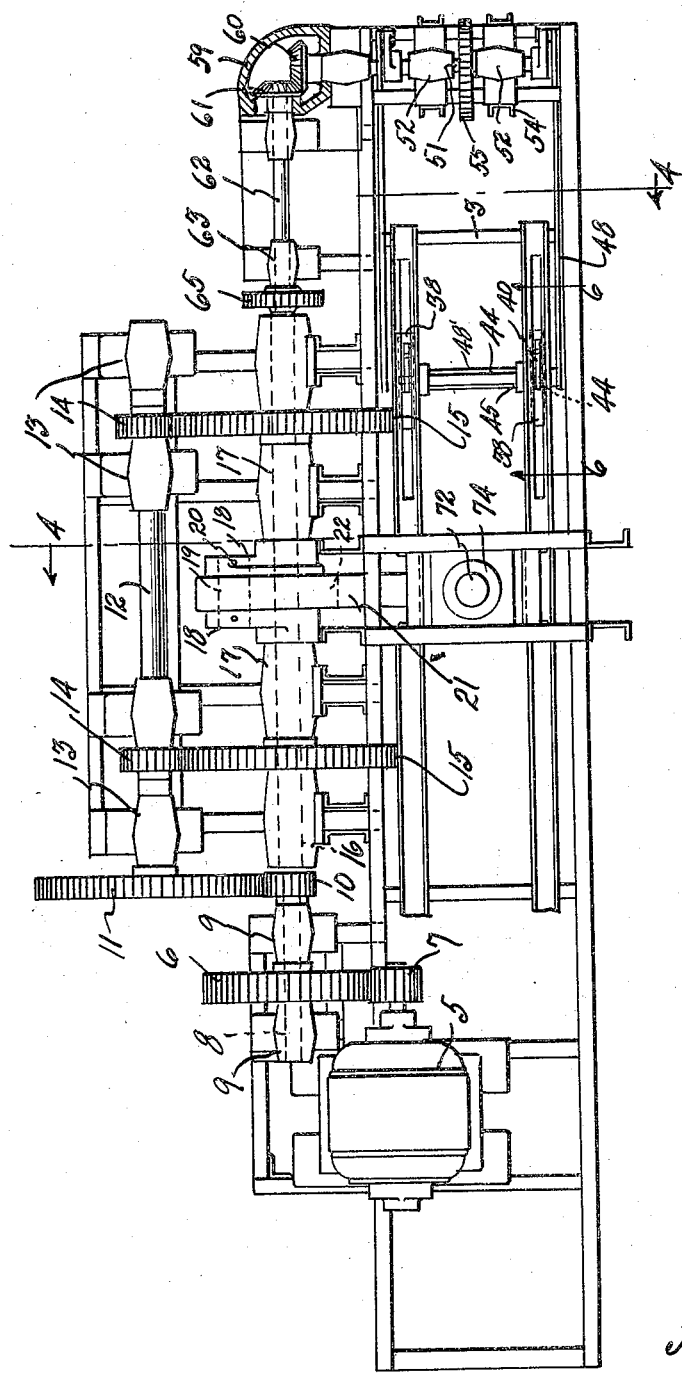
Figure 1 is a plan view of an apparatus embodying my invention.

In assembling vehicle spoked wheels they are first partially assembled by engaging the outer ends of the spokes with the felly or rim and their inner mitered ends are forced into sufficient contact with each other to hold the spokes. At this time the inner mitered ends of the spokes are offset laterally either in one direction or both directions relative to their final operative positions. The partially assembled wheels are then placed upon suitable presses and the spokes are forced into their final operative positions, thereby forcing the outer ends of the spokes firmly against the felly or rim. The apparatus shown in the present instance is designed to advance the partially assembled wheels and to force the spokes into their final operative positions during the advancement.

1 is a continuous conveyor having its upper portion guided by and and supported upon the channel shaped tracks 2 which extend horizontally and are supported upon the cross bars 3 forming part of the frame of the apparatus. The conveyor extends longitudinally of the frame and is movable in the direction of the arrow shown in Figure 2. Transversely aligned links of the conveyor chains carry the wheel carriers 4 which are bifurcated to embrace aligned spokes of the wheels.

For forcing the spokes into their final operative positions, I have provided cooperating abutments engageable with the upper and lower sides of the spokes. One of the abutments is stationary while the other is mechanically operated. The operating means includes the electric motor 5 which is mounted upon the frame near its loading end. This motor drives the fly wheel gear 6 through the pinion 7. This fly wheel gear is keyed upon the countershaft 8 which is journaled in the pillow blocks 9 secured to the frame. 10 is a pinion keyed upon the countershaft 8 and meshing with the gear 11 which is keyed upon the countershaft 12, this countershaft also being journaled in pillow blocks 13 which are mounted upon the frame. These pillow blocks are arranged in pairs and intermediate each pair is a pinion 14 which is keyed upon the countershaft 12 and meshes with the crank shaft gear 15. Each crank shaft gear is keyed upon a crank shaft 16 journaled in the pillow blocks 17 upon the frame of the apparatus at opposite sides of the crank shaft gear. The crank shafts 16 have secured to their adjacent ends as by means of keys the cranks 18 through which passes the crank pin 19, this latter being preferably fixedly secured to the cranks as by means of the transverse pins 20. 21 is a connecting rod having an eye 22 through which the crank pin 19 extends. The opposite end of this connecting rod has the bifurcations 23 which are connected to pairs of toggle levers 24 and 25 connected to the lower abutment 26. This abutment is engageable with the lower sides of the spokes and is adapted to pass upwardly between the conveyor chains and carry the partially assembled wheel upwardly to bring the upper sides of the spokes against the upper abutment 27.

28 is a ram which has secured to its upper end the lower abutment 26. This ram is guided during its vertical reciprocation at both its upper and lower ends in the upper and lower guide blocks 29 and 30, respectively, which are rigidly mounted upon the frame. The lower ends of the lower toggle levers 24 are pivotally connected to the lower guide block 30 by the pins 31 while the upper ends of the upper toggle levers 25 are pivotally connected to the ram 28 below the upper guide block 29 by the pins 32. The bifurcations 23 of the connecting rod 21 are pivotally connected to each pair of upper and lower toggle levers by the pins 33. To relieve these pins from excessive load so that they may be made of relatively small diameter, I provide the upper and lower thrust blocks 34 and 35, respectively, for bearing against the rounded ends of the upper and lower toggle levers 25 and 24, respectively. These thrust blocks are rigidly secured respectively to the ram 28 and lower guide block 30. I also provide cooperating contacting surfaces upon the meeting ends of the upper and lower toggle levers, these toggle levers as shown each having a short bifurcation 36 and a long bifurcation 37 and being so arranged that the pin 33 for connecting the connecting rod 21 to each pair of toggle levers extends loosely through the long bifurcations 37. The long bifurcations are provided with circular ends while the short bifurcations are provided with concave ends for fitting the circular ends of the long bifurcations and thereby providing for direct thrust contact.

To advance the conveyor, I provide mechanical operating means for intermittently advancing the conveyor. Furthermore, this mechanical operating means is timed to advance the conveyor only while the lower abutment 26 and ram 28 are in their lower positions. In detail, 38 are slides mounted upon the horizontal flanges of the angle bars 39 which extend longitudinally of the frame of the apparatus and are directly supported upon the cross bars 3. These angle bars carry the tracks 2 spaced above their horizontal flanges and the slides are located in the spaces between the horizontal flanges of the angle bars and the bases of the tracks. The bases of the tracks are formed with the longitudinally extending slots 2' near the unloading end of the apparatus and dogs 40 are adapted to extend upwardly through these slots. These dogs are carried by the slides, which latter are longitudinally slotted at 41 to receive the dogs and are provided with the transverse pins 42 which extend through the lower ends of the dogs for pivotally connecting the same to the slides. For normally holding each of the dogs so that its upper end will engage the pivots connecting the links of the chain, I have provided the spring 43 which is coiled around the pin 42 and has one end engaging the under side of the dog and the other end engaging the bottom of the slot 41. 44 is a shaft extending transversely of and connecting the two slides 38 and 45 are levers through the upper ends of which the shaft 44 extends, the lower ends of these levers being mounted upon the transverse shaft 46. 47 are links having openings at their front ends through which the shaft 46 extends and other openings at their rear ends through which the shaft 47' extends, this shaft being mounted upon the frame. 48 are links above the levers 47 and connected to the levers 45 by means of the transverse shaft 48' which extends through these latter levers as well as the front ends of the links 48. The rear ends of the links 48 are pivotally connected to the crank arms 49 by means of the transverse shaft 50 extending through the free ends of these crank arms and the rear ends of the links 48. The crank arms are keyed upon the shaft 51 which extends transversely of the frame at its unloading end and is journaled in the pillow blocks 52 secured to the angle bars 53 mounted upon the spaced upright angle bars 54. 55 is a gear wheel keyed upon the shaft 51 between the pillow blocks 52 and meshing with the gear wheel 56 therebeneath. This latter gear wheel is keyed upon the shaft 57 extending parallel to and below the shaft 51 and journaled at one end adjacent to the gear wheel 56 in the pillow block 58, which is supported in the same manner as either of the pillow blocks 52, and at its opposite end in the split angular housing 59. 60 is a bevel gear keyed upon the shaft 57 and meshing with the bevel gear 61 keyed upon the shaft 62 which extends longitudinally of the frame at the same side thereof as the main portion of the mechanical operating means. Both the bevel gears 60 and 61 are housed within the split angular housing 59 and one end of the shaft 62 is journaled also in this housing. The opposite end of the shaft 62 is journaled in the pillow block 63 and has keyed thereto the gear wheel 64 which is below and meshes with the gear wheel 65 upon the rear crank shaft 16.

With the construction as thus far described, the crank arms 49 are located upon the shaft 51 so that they will swing the levers 45 rearwardly and correspondingly move the slides 38 and dogs 40 while the lower abutment 26 and the ram 28 are in their lower positions. During this rearward movement of the slides and dogs the conveyor is being advanced rearwardly to bring another partially assembled wheel into registration with the abutments 26 and 27. During the return movement of the slides and dogs the dogs merely pass over the pivots connecting the links of the conveyor chains. At the same time the cranks 18 through the connecting rod 21 straighten the toggle levers to raise the ram 28 and lower abutment 26 to thereby force the spokes to their final operative positions.

For controlling the advance of the conveyor to position the partially assembled wheels in registration with the abutments 26 and 27, the shaft 47' is adjustably mounted upon the frame of the apparatus. As shown, this shaft is journaled in the pillow blocks 66 which are longitudinally slidably mounted upon the longitudinal bars 67 supported upon the side uprights of the frame. These pillow blocks 66 are adjustable either forwardly or rearwardly as by means of the set screws 68 threadedly engaging the uprights 69 upon the bars 67 both in front and rear of the pillow blocks.

By providing the longitudinal slot 22 in the connecting rod and by arranging the parts so that the toggle levers 24 and 25 are not quite in alignment when the lower abutment 26 is in its uppermost position, the lower abutment can remain in its lower position without being raised for a sufficient length of time to permit the advancement of the conveyor. To assure lowering of the lower abutment one of the cranks 18 is provided with the cam 70 which is engageable with the roller 71 upon the connecting rod 21 and adapted to compel movement of the connecting rod in a direction to break the toggle levers and lower the lower abutment.

The upper abutment 27 is vertically adjustably mounted upon the frame of the apparatus to properly position this abutment relative to the lower abutment 26 when in its uppermost position. As shown, the upper abutment is secured to the screw 72 which threadedly engages the block 73 rigidly mounted upon the frame. 74 is a lock nut threadedly engaging the screw above the block.

What I claim as my invention is:

1. In an apparatus for assembling vehicle spoked wheels, the combination with an abutment, of a cooperating abutment and means for moving said cooperating abutment toward said first-mentioned abutment including a ram carrying said cooperating abutment, spaced guide blocks for said ram, toggle levers pivotally connected to each other and to said ram and one of said guide blocks and thrust blocks upon said ram and guide block engageable with the ends of said toggle levers.

2. In a machine for assembling vehicle spoked wheels, the combination with cooperating abutments engageable with the wheel spokes, a ram carrying one of said abutments, toggle levers for actuating said ram, a crank, a connecting rod between said toggle levers and crank and a cam upon said crank for compelling movement of said connecting rod in one direction.

3. In a machine for assembling vehicle spoked wheels, the combination of cooperating abutments, a ram carrying one of said abutments, toggle levers for actuating said ram, a crank, a connecting rod pivotally connected at one end to said toggle levers and loosely connected at the other end to said crank, a roller upon said connecting rod and a cam upon said crank engageable with said roller to move said connecting rod in one direction.

4. In an apparatus for assembling vehicle spoked wheels, the combination with a conveyor, of a slide, a dog upon said slide engageable with said conveyor, a lever pivotally connected at its upper end to said slide, a link pivotally connected to the lower end of said lever, an adjustable pivot for said link, a second link pivotally connected to said lever intermediate its ends and a crank pivotally connected to said second link.

In testimony whereof I affix my signature.

JOSEPH E. BATIE.